(12) United States Patent
Huth

(10) Patent No.: US 6,199,684 B1
(45) Date of Patent: Mar. 13, 2001

(54) BULK MATERIALS LOADING DEVICE

(75) Inventor: Alan Huth, Gladstone (AU)

(73) Assignee: Gladstone Port Authority, Gladstone (AU)

( * ) Notice: Subject to any disclaimer, the term of this patent is extended or adjusted under 35 U.S.C. 154(b) by 0 days.

(21) Appl. No.: 09/367,479

(22) PCT Filed: Feb. 16, 1998

(86) PCT No.: PCT/AU98/00087

§ 371 Date: Aug. 12, 1999

§ 102(e) Date: Aug. 12, 1999

(87) PCT Pub. No.: WO98/35897

PCT Pub. Date: Aug. 20, 1998

(30) Foreign Application Priority Data

Feb. 17, 1997 (AU) .................................................. PO5119

(51) Int. Cl.⁷ .................................................. B63B 27/00
(52) U.S. Cl. .................. 198/524; 198/532; 414/143.1; 141/264
(58) Field of Search .................... 198/524, 532; 414/143.1, 294; 141/264

(56) References Cited

U.S. PATENT DOCUMENTS

| | | | |
|---|---|---|---|
| 1,448,272 | * 3/1923 | Kelly | 198/532 |
| 1,852,385 | * 4/1932 | Weigert | 198/524 |
| 3,526,344 | * 9/1970 | Koning | 198/532 |
| 3,858,733 | 1/1975 | Morioka et al. | 214/17 CA |
| 4,225,033 | * 9/1980 | Fukagai et al. | 198/524 |
| 4,270,671 | 6/1981 | Arnold | 222/58 |
| 4,658,992 | * 4/1987 | Peleus | 198/532 |
| 5,016,686 | 5/1991 | Gerstenkorn | 141/96 |
| 5,697,408 | 12/1997 | Reeves | 141/284 |

* cited by examiner

Primary Examiner—Christopher P. Ellis
Assistant Examiner—Mark A Deuble
(74) Attorney, Agent, or Firm—Wells, St. John, Roberts, Gregory & Matkin P.S.

(57) ABSTRACT

Bulk material is fed by a conveyor (10) into a hopper at the upper end of an upright extendible conduit (12). A fractionally opening gate (14) at the lower end of the conduit controls the rate at which the material in the conduit is discharged onto a discharge conveyor (15). Level sensors (13) detect the level of material in the hopper (18). A programmable logic controller (17) has its inputs connected to the sensors (13) and a belt weigher (11) associated with the conveyor (10), and controls the opening of the gate (14) to maintain a substantially full column of material in the conduit (12). The material discharged into the hopper (18) therefore moves slowly down the conduit in a controlled fashion, with minimal dust generation and product degradation.

13 Claims, 1 Drawing Sheet

BULK MATERIALS LOADING DEVICE

THIS INVENTION relates to bulk materials handling. In particular, the invention is directed to apparatus for delivering bulk materials in a controlled manner. The invention has particular application to the loading of coal, grain or other particulate or powdered material onto ships, although the invention is not limited to those particular uses.

BACKGROUND ART

When loading bulk material, such as coal or grain, into the hold of a ship, the bulk material is normally carried by a belt conveyor to a position above the hold to be filled, and then discharged under gravity into the hold. There are several problems associated with this basic loading method. First, the falling material generates a considerable amount of dust, posing health risks and fouling the environment. The fall from the conveyor into the hold is also likely to degrade the product, and cause unwanted aeration. The impact of the material on parts of the ship or other equipment accelerates abrasive wear of such parts of equipment.

Various types of bulk materials handling equipment have been developed in order to reduce one or more of the abovementioned problems. One device, sold under the trade name CHOKEFEEDER, attempts to minimise dust generation during loading by discharging the product into a spout at the end of the belt conveyor, and "choking" off or sealing the bottom of the spout by a set of vanes which are either fully opened or closed. Material is fed continuously into the top of the spout and freefalls down the spout. When the product builds up to a predetermined height, the vanes are opened fully to discharge the product. When the product level in the spout falls to a level near the bottom, the vanes are closed until the product builds up to the upper limit again.

Although this device reduces dust generation, it still allows the product to free fall, on average, an appreciable distance (which can be up to the full height of the spout). The product gains speed and tends to segregate while free-falling. Its movement is then halted abruptly as it impacts against the stationary product at the base before being forced through the discharge control valves. The operation involves repeated filling and emptying of the spout.

The upper and lower product operating heights of the CHOKEFEEDER can be varied for different products. When loading fragile materials, such as petroleum coke, the control system varies the discharge vane opening and closing times to keep the working range of the product closer to the upper end of the spout to limit the distance that the product falls. Since the vanes are either fully open or fully shut, the product is still subjected to the repetitive starting and stopping motion which results in product degradation and some dust generation. Further, as the vanes open and close frequently under load, large inertia forces are generated as the column of material stops and starts suddenly.

Another known method of material transfer uses a series of hoppers or cones. Material cascades from one cone to the next down the length of the feeder. The design tries to limit the maximum velocity achieved by the material in the spout. However, this method still results in the product accelerating and decelerating from one cone to the next.

It is an object of the present invention to provide an improved materials handling system which overcomes or ameliorates at least some of the abovedescribed problems, or which at least provides a useful alternative.

SUMMARY OF THE INVENTION

In one broad form, this invention provides apparatus for loading bulk material, comprising
  a conduit having an inlet at its upper end adapted to receive a flow of the material, and having a discharge outlet at its lower end,
  a controllable gate mechanism at the lower end of the conduit for regulating the flow of material through the outlet,
  means for sensing the level of material in the conduit, and
  control means having an input connected to the level sensing means and adapted to control the operation of the gate mechanism to maintain the conduit substantially or nearly full of material during steady state operation, wherein the gate mechanism is able to be fractionally or partially opened by the control means.

In another form, the present invention provides a method of bulk materials handling in which material flows into an inlet at the top end of a conduit and is discharged through a controllable gate mechanism having a fractionally variable opening at the bottom end of the conduit, the method comprising the steps of
  sensing the level of material in the conduit, and controlling the operation of the gate mechanism so that the conduit is kept substantially or nearly full.

Typically, the materials handling system is used for loading particulate product. The product, which may be conveyed to the loading site by a belt conveyor, is loaded into a receptacle, such as a ship's hold, through the conduit. At start-up, the gate mechanism is closed or only partly opened until the conduit is full or nearly full. Thereafter, during steady state operations, the gate mechanism is controlled to permit discharge of material from the conduit at a rate matching the infeed rate, thereby maintaining a full column of material in the conduit. That is, the gate mechanism is not necessarily fully opened, but rather its opening is proportionately or fractionally controlled. The material is therefore "extruded" through approximately the full height of the conduit in a fully controlled motion with near constant velocity, rather than free-falling into a pile.

Preferably, the system also includes means for monitoring the flow of material into the conduit. If the material is delivered to the conduit by a belt conveyor, such means may suitably be in the form of a belt weigher the output of which is fed to the control means. The conduit can therefore be "preconditioned" to accommodate variations in material infeed rate.

The conduit may be of fixed length, or may be of variable length, e.g. telescoping. The gate mechanism can be regulated by the control means to accommodate changes in the length of the conduit.

Preferably, a variable speed conveyor belt is located immediately below the bottom end of the conduit, the speed of the belt being controlled by the control means. By controlling the gate mechanism and regulating the speed of the discharge belt conveyor, the control means is able to accurately control the rate of material discharge from the conduit.

Typically, the control means is a programmable controller.

In order that the invention may be more fully understood and put into practice, a preferred embodiment thereof will now be described with reference to the accompanying drawing.

DESCRIPTION OF PREFERRED EMBODIMENT

Figure 1:
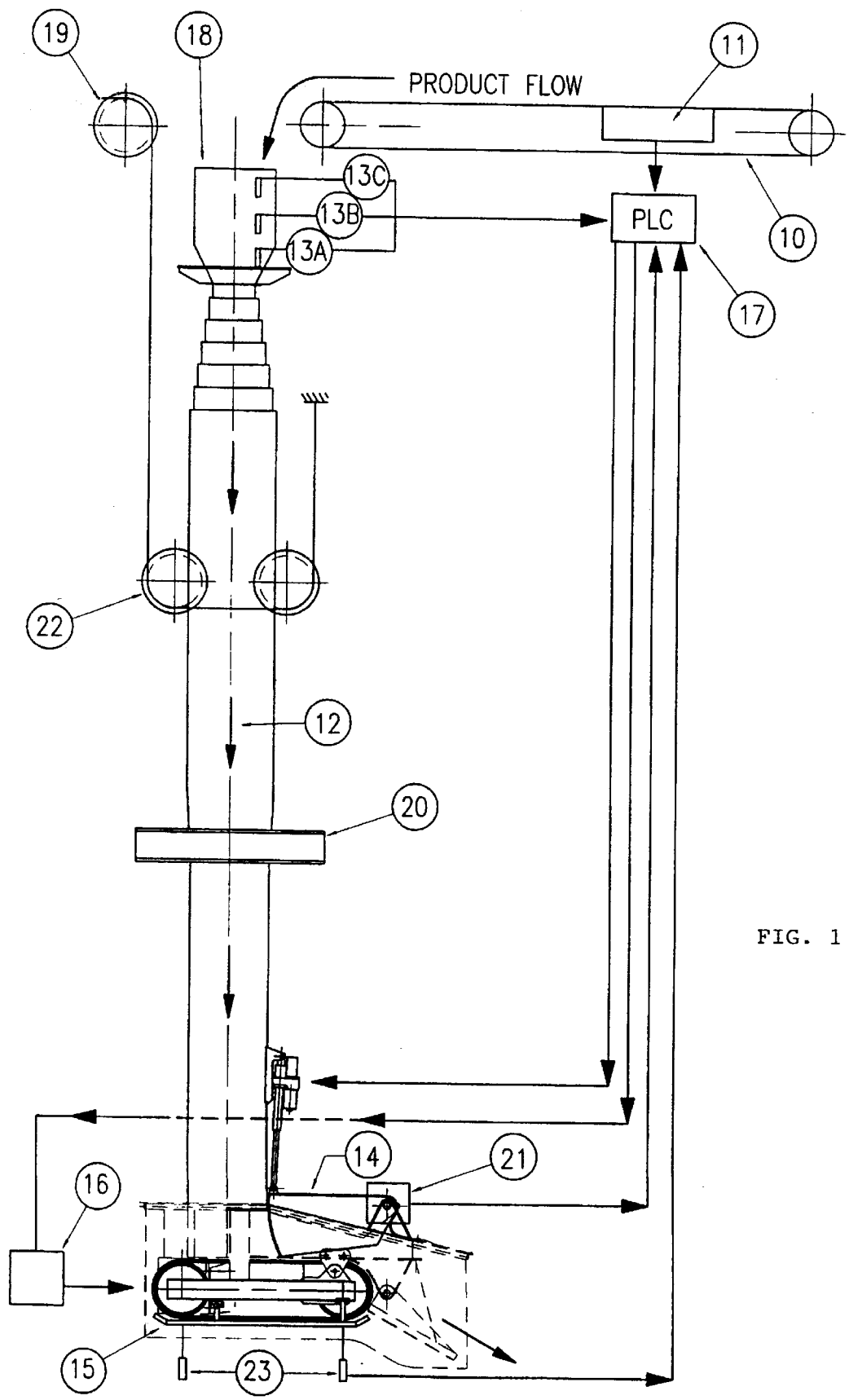
FIG. 1 is a schematic diagram illustrating the operation of a materials loading system.

As shown in the drawing, a product such as coal, grain or other bulk material, is carried on a belt conveyor 10 which incorporates a belt weigher 11. The belt weigher is known in the art and need not be described in detail. The product is discharged by the conveyor into a hopper 18 at the top of a vertical or inclined conduit 12.

The conduit 12 may be of fixed length, but is preferably of adjustable length, e.g. of telescoping construction as shown. The length of the conduit 12 can be varied by winch 19 which is connected to one end of a cable, the other end of which is fixed. The cable passes around sheaves or pulleys 22 on the conduit. By winding or unwinding the cable, the winch 19 is able to shorten or lengthen the length of the conduit 12.

Level sensors 13 are provided at the upper end of the conduit 12. In the illustrated embodiment, three sensors 13A, 13B, 13C detect the presence of material at three respective heights in the hopper 18.

The discharge of material from the bottom end of the conduit 12 is controlled by a controllable opening, such as an arc gate 14. The arc gate 14 can be partially or fractionally opened by a control device, such as a programmable logic controller (PLC) 17. Through a suitable electromagnetic circuit, the PLC 17 controls the gate's electromechanical actuator to close the gate 14 or open it to the required degree. The position of the arc gate 14 is monitored by arc gate position sensor 21 which feeds this information back to the PLC 17.

A variable speed belt conveyor 15 is positioned closely below the bottom end of the conduit 12. The speed of the belt 15 is controlled by speed controller 16 which, in turn, is controlled by the PLC 17. When the gate 14 is open, the material at the bottom end of the conduit 12 flows onto the belt 15, and is discharged, e.g. into the hold of a ship. The speed of belt 15 is controlled to ensure that material flows freely out of the gate 14, i.e. there is no back-up of material outside the gate 14.

The belt 15 is typically mounted on a conveyor frame fixed to a conduit section which is suspended from conduit 12 by slew bearing 20. The hopper 18 and conduit 12 are suspended at the end of the frame of belt conveyor 10.

In use, the PLC 17 receives inputs from the belt weigher 11 and the level sensors 13, and controls the fractional opening of the arc gate 14 and the belt speed controller 16 to maintain a full column of product in the conduit 12. In other words, the PLC 17 is provided with information relating to the amount of product flowing into the conduit 12 and the level of product in the conduit. The PLC 17 controls the discharge of product from the lower end of the conduit 12 by fractional opening of the arc gate 14, to maintain the level of material in the conduit 12 at or around a desired height.

Unlike known loading devices, the illustrated embodiment minimises the distance that the product is allowed to fall by ensuring that the conduit 12 is kept full or nearly full. At start-up, the gate 14 is kept fully or partially closed by the PLC 17 until the product in the conduit 12 builds up to the required level as sensed by the level sensors 13A–13C. Thereafter, the gate 14 is opened wider to allow the product in the conduit 12 to flow onto belt 15 for discharge. However, the gate 14 is opened only to such extent that the rate of discharge approximately equals the rate of product flow into the conduit 12, so that the conduit remains full or nearly full.

In this manner, the product is "extruded" through the conduit 12 in a fully controlled motion with near constant velocity, rather than free-falling to a sudden stop. After the start-up phase, the product always remains in slow motion down the length of the conduit 12 with no stopping or starting of the product flow in the conduit.

Furthermore, product aeration is minimised as the column of product in the conduit 12 forces the air out and minimises voids in the product.

During operations, it may be necessary to change the length of the conduit 12 to accommodate variations in the height of the discharge pile beneath the belt feeder 15, or changes in height of the container or vessel into which the product is being loaded (e.g. caused by tidal variations in the case of a ship). Tilt switches 23 are provided below the belt feeder 15. As the stockpile below the discharge conveyor 15 rises, it eventually contacts and trips the underside tilt switches 23. The tilt switches are connected to the PLC 17. The PLC 17 responds to the tripping of the switches 23 by raising the telescopic conduit 12 by a predetermined height, e.g. one meter. In this manner, the freefall height of the product from the discharge conveyor 15 to the stockpile below is always kept to a meter or less, thereby reducing dust generation and product attrition.

The PLC 17 maintains the product column height in the conduit 12 at or near a constant level by continuously adjusting the discharge arc gate opening 14 and/or the speed of the discharge belt feeder 15 based upon (i) the current mass flow rate into the conduit 12, (ii) the product column height within the conduit 12, and (iii) the particular use or positioning of the loading device which may require the length of the conduit 12 to be lengthened or shortened.

From the information received, the PLC 17 continuously calculates a target setting for the arc gate 14. This target setting is defined as the fractional opening position of the gate 14 which will provide a discharge rate equal to the inflow rate, thereby maintaining the product column at a constant height. For a fixed length conduit 12, the target setting is calculated by measuring the inflow rate over the belt weigher 11 and dividing this figure by a calibration factor to give the target setting for the gate 14. If the conduit 12 is being lengthened or shortened, such lengthening or shortening is also taken into account by the PLC 17 when calculating the target setting.

By continually monitoring the level of material in the conduit 12, as well as measuring the product in feed rate ahead of time, the PLC 17 can control the operation of the arc gate 14 and the discharge belt conveyor 15 to accommodate changes in the length of the conduit 12 while maintaining the required column of material in the conduit.

A typical operating procedure for the loading apparatus will now be described by way of example only:

Step Action (1) The discharge belt feeder 15 is started.

(2) The arc gate 14 is closed by the PLC to a minimum default open position equal to approximately 35% of the target rate.

(3) The feed belt 10 is started. As the flow of product into the telescopic conduit will exceed the discharge rate determined by the partial opening of gate 14, the conduit 12 will fill rapidly to minimise the freefall height of the product.

(4) When the product level reaches and trips the lowest tilt switch 13A, the PLC responds by adjusting the opening of the arc gate 14 to the calculated target opening less 7%.

(5) The product level will keep rising, but at a slower rate, until the product reaches and trips the intermediate level switch 13B. The PLC 17, which is continuously recalculating the target opening, responds by adjusting the arc gate 14 to a setting which matches the inflow rate.

(6) If the level in the hopper 18 rises and trips the uppermost tilt switch 13C, the PLC 17 responds by opening the arc gate 14 to 25% more than the current target opening, and locks out the operation of the arc gate 14 for a predetermined period of time so as to enable the level to drop. After this lockout time, the level in the hopper will be below the lowest tilt switch 13A. Without tilt switch 13A being tripped, the PLC again reduces the arc gate 14 opening to the startup default setting of 35% less than the design tonnage rate. The product level in the hopper will again start to rise towards the tilt switches.

(7) If the conduit 12 is to be shortened, the PLC 17 opens the arc gate 14 by an extra 25% to provide the extra flow rate required to allow for the loss of internal volume caused by the shortening of the conduit 12.

(8) If the conduit 12 is lengthened, no special control changes are required as the product level in the telescope will temporarily fall, before rising again.

The described loading apparatus has a number of advantages, including:

- Dust generation and product degradation are minimised, since product free-fall is reduced to an absolute minimum. The column of product effectively stands on the discharge belt conveyor. The rate of product discharge is governed by both the amount of opening of the discharge arc gate as well as the belt conveyor speed.
- The product is de-aerated as trapped air is squeezed out.
- Since the relative velocity between the product and all surfaces with which it comes into contact is low, abrasive wear of such surfaces is minimised.
- The loading system is compact and relatively lightweight, enabling it to be installed not only on new bulk materials handling systems, but also to be retrofitted to older materials handling equipment which may have limited static and dynamic load ratings.
- The described loading device is able to handle a wide variety of bulk materials.
- If a surge or change in feed rate is detected on the feed conveyor, the controller can calculate the gate opening position required to accommodate the new tonnage rate and "preconditions" the conduit so that it is ready ahead of time to accommodate the surge or change in feed rate.

The foregoing describes only one embodiment of the invention, and modifications which are obvious to those skilled in the art may be made thereto without departing from the scope of the invention. For example, any other suitable controller may be used instead of the PLC.

What is claimed is:

1. Apparatus for loading bulk material, comprising
   a conduit having an inlet at its upper end adapted to receive a flow of the material, and having a discharge outlet at its lower end,
   a controllable gate mechanism at the lower end of the conduit for regulating the flow of material through the outlet,
   means for sensing level of material in the conduit, and
   control means having an input connected to the level sensing means and adapted to control the operation of the gate mechanism to maintain the conduit substantially or nearly full of material during steady state operation, characterised in that the gate mechanism is able to be fractionally or partially opened by the control means.

2. Apparatus as claimed in claim 1, further comprising means for monitoring the flow of material into the conduit, the output of the monitoring means being connected to the control means.

3. Apparatus as claimed in claim 2, wherein the material is delivered to the conduit by a conveyor, the monitoring means being a weighing device associated with the conveyor.

4. Apparatus as claimed in claim 1, wherein the sensing means comprises a plurality of sensors located at different heights at the upper end of the conduit.

5. Apparatus as claimed in claim 4, wherein the conduit has a hopper formation at its upper end, the sensors being located in the hopper.

6. Apparatus as claimed in claim 1, wherein the conduit is of variable length.

7. Apparatus as claimed in claim 6, wherein the conduit is of telescoping construction, further comprising means for varying the length of the conduit.

8. Apparatus as claimed in claim 6, further comprising proximity sensing means located below the conduit and having an output connected to the control means, the control means being responsive to the proximity sensing means to shorten the length of the conduit.

9. Apparatus as claimed in claim 1, further comprising a discharge conveyor located below the lower end of the conduit.

10. Apparatus as claimed in claim 9, wherein the speed of the discharge conveyor is controllable by the control means.

11. Apparatus as claimed in claim 1, wherein the control means comprises a programmable logic controller.

12. A method of loading bulk material in which the material flows into the upper end of a conduit and is discharged through a controllable gate mechanism having a fractionally variable opening at the lower end of the conduit, the method comprising the steps of
    sensing level of material in the conduit, and
    controlling the opening of the gate mechanism so that the conduit is substantially or nearly full of material during steady state operation.

13. Apparatus for delivering bulk material, comprising
    an upright conduit,
    means for sensing level of material in the conduit,
    a controllable outlet at the lower end of the conduit, and
    control means for controlling the outlet to maintain the material in the conduit at approximately a desired level, characterised in that the outlet is a fractionally variable opening.

* * * * *